(12) United States Patent
McLean

(10) Patent No.: US 9,037,993 B2
(45) Date of Patent: *May 19, 2015

(54) SYSTEM AND METHOD FOR USING A VISUAL PASSWORD SCHEME

(75) Inventor: Ivan Hugh McLean, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

This patent is subject to a terminal disclaimer.

(21) Appl. No.: 13/348,737

(22) Filed: Jan. 12, 2012

(65) Prior Publication Data

US 2012/0110498 A1    May 3, 2012

Related U.S. Application Data

(63) Continuation of application No. 11/070,366, filed on Mar. 1, 2005, now Pat. No. 8,145,912.

(51) Int. Cl.
| | | |
|---|---|---|
| *G06F 21/36* | (2013.01) | |
| *G06F 21/31* | (2013.01) | |
| *G06F 3/0481* | (2013.01) | |
| *G06F 3/0488* | (2013.01) | |

(52) U.S. Cl.
CPC .............. *G06F 21/36* (2013.01); *G06F 21/31* (2013.01); *G06F 3/04886* (2013.01); *G06F 3/0481* (2013.01)

(58) Field of Classification Search
CPC ......... G06F 21/31; G06F 21/36; G06F 21/46; G06F 21/00
See application file for complete search history.

(56) References Cited

U.S. PATENT DOCUMENTS

| | | | | |
|---|---|---|---|---|
| 5,465,084 A | * | 11/1995 | Cottrell | ........................ 340/5.27 |
| 5,559,947 A | | 9/1996 | Wugofski | |
| 5,559,961 A | | 9/1996 | Blonder | |
| 6,278,453 B1 | | 8/2001 | Bodnar | |
| 6,643,784 B1 | * | 11/2003 | McCulligh | ...................... 726/18 |

(Continued)

FOREIGN PATENT DOCUMENTS

| | | |
|---|---|---|
| JP | 1040376 | 2/1998 |
| WO | WO2004027632 | 4/2004 |

OTHER PUBLICATIONS http://csrc.nist.gov/groups/SNS/mobile_security/documents/mobile_devices/PP-VisualAuthentication-rev-DS04.pdf.

(Continued)

*Primary Examiner* — Claudia Dragoescu
(74) *Attorney, Agent, or Firm* — Nicholas A. Cole

(57) ABSTRACT

A system and method for inputting a password. The system and method operates to associate unique non-descriptive graphical features with unique text-based characters. The system and method operates to receive in sequence, a plurality of text-based characters. The system and method operates to display in sequence, in accordance with a sequence scheme, the non-descriptive graphical features associated with the plurality of text-based characters. The system and method also operates to process the plurality of text-based characters as the password. In addition, the system and method operates wherein the password, including text-based characters, may be deciphered from both the display of the non-descriptive graphical features associated with the plurality of text-based characters and the sequence scheme.

24 Claims, 8 Drawing Sheets

(56) References Cited

U.S. PATENT DOCUMENTS

| | | |
|---|---|---|
| 6,720,860 B1 | 4/2004 | Narayanaswami |
| 6,910,179 B1 * | 6/2005 | Pennell et al. ................ 715/207 |
| 6,980,081 B2 | 12/2005 | Anderson |
| 7,124,433 B2 | 10/2006 | Little |
| 7,188,314 B2 | 3/2007 | Mizrah |
| 7,376,899 B2 | 5/2008 | Mantyla |
| 7,451,323 B2 | 11/2008 | Abe et al. |
| 8,145,912 B2 | 3/2012 | McLean |
| 2003/0093699 A1 | 5/2003 | Banning et al. |
| 2003/0210127 A1 | 11/2003 | Anderson |
| 2004/0010721 A1 | 1/2004 | Kirovski et al. |
| 2004/0030934 A1 | 2/2004 | Mizoguchi et al. |
| 2004/0119746 A1 | 6/2004 | Mizrah |
| 2004/0225880 A1 | 11/2004 | Mizrah |
| 2004/0225899 A1 | 11/2004 | Mizrah |
| 2004/0230843 A1 * | 11/2004 | Jansen .......................... 713/202 |
| 2004/0250138 A1 | 12/2004 | Schneider |
| 2004/0260955 A1 * | 12/2004 | Mantyla ........................ 713/202 |
| 2005/0010785 A1 | 1/2005 | Abe et al. |
| 2006/0174339 A1 | 8/2006 | Tao |
| 2007/0277224 A1 | 11/2007 | Osborn et al. |
| 2008/0016369 A1 | 1/2008 | Kirovski et al. |

OTHER PUBLICATIONS

International Search Report, PCT/US06/07194, International Searching Authority, USPTO, Jul. 7, 2008.

W. A. Jansen, "Authenticating Users on Handheld Devices," in Proceedings of Canadian Information Technology Security Symposium, 2003.

W. Jansen, S. Gavrila, V. Korolev, R. Ayers, and R. Swanstrom, "Picture Password: A Visual Login technique for mobile Devices," National Institute of Standards and Technology Interagency Report NISTIR 7030, 2003.

Written Opinion, PCT/US06/07194, International Searching Authority, USPTO, Jul. 7, 2008.

\* cited by examiner

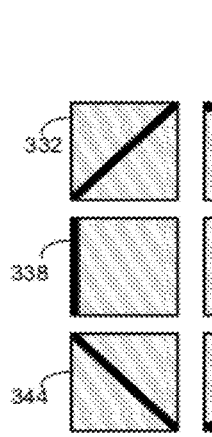
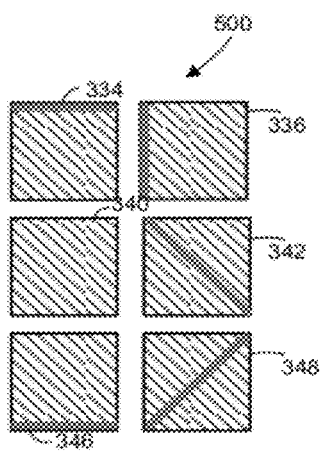
FIG. 4
FIG. 5
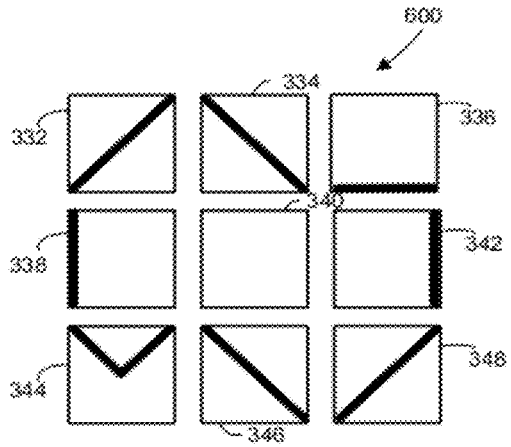
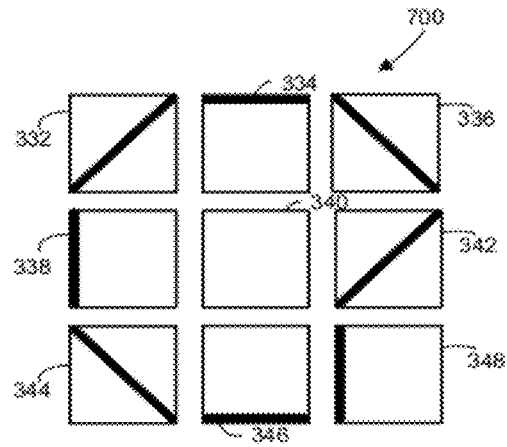
FIG. 6
FIG. 7

SYSTEM AND METHOD FOR USING A VISUAL PASSWORD SCHEME

CLAIM OF PRIORITY UNDER 35 U.S.C. §120

This application is a Continuation of patent application Ser. No. 11/070,366 entitled "System and Method for Using a Visual Password Scheme" filed Mar. 1, 2005, assigned to the assignee hereof, the entire contents of which are hereby incorporated by reference.

BACKGROUND

I. Field

The present invention generally relates to a password scheme that utilizes graphical features in conjunction with a user password. More particularly, the invention relates to the use of graphical features in conjunction with a user password to promote password recollection.

II. Background

Advances in technology have resulted in smaller and more powerful personal computing devices. For example, there currently exist a variety of portable personal computing devices, including wireless computing devices, such as portable wireless telephones, personal digital assistants (PDAs), and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. Typically, these smaller and more powerful personal computing devices are severely resource constrained. For example, the screen size, amount of available memory and file system space, amount of input and output capabilities and processing capability may be each limited by the small size of the device. Because of such severe resource constraints, it is often typically desirable, for example, to maintain a limited quantity and/or size of input keys and other user input mechanisms residing on such personal computing devices. Such limited quantity and/or size of input mechanisms are generally known to produce poor user input interface functionality.

Some of these personal computing devices utilize application programming interfaces ("APIs"), sometimes referred to as runtime environments and software platforms, that are installed onto their local computer platform and which are used, for example, to simplify operation of such devices, such as by providing generalized calls for device specific resources. Further, some such APIs are also known to provide software developers the ability to create software applications that are fully executable on such devices. In addition, often such APIs are known to be operationally located between the computing device system software and the software applications such that the computing device computing functionality is made available to the software applications without requiring the software developer to have the specific computing device system source code. Further, some like APIs are known to provide mechanisms for processing user passwords in such a manner as to restrict and control access to such personal computing devices. In some instances such password processing is performed, at least in part, remotely to the personal computing device.

Examples of such an APIs, some of which are discussed in more detail below, include those currently publicly available versions, including versions 3.1, of the Binary Runtime Environment for Wireless® (BREW®) developed by Qualcomm, Inc., of San Diego, Calif. BREW® is sometimes described as a thin veneer existing over a computing device's (typically a wireless cellular phone) operating system, which, among other features, provides interfaces to hardware features particularly found on personal computing devices. BREW® is further characterized by, at least, the one advantage of being able to be provided on such personal computing devices at a relatively low cost with respect to demands on such device resources and with respect to the price paid by consumers for devices containing the BREW® API. Other features known to be associated with BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

Regarding providing mechanisms for processing user passwords in such a manner as to restrict and control access to such personal computing devices to only authorized users, including the processing of passwords remotely to such personal computing devices, many systems typically achieve such restricted access, in part, by recording keystrokes received through an input device or mechanism. In one example, each key represents a single potential component for use in a multi-component password scheme. Here, a device with 10 keys is capable of as many unique passwords as there are combinations of 10 keys allows. However, in another embodiment, where such embodiment includes the additional functionality of recognizing of the simultaneous pressing of a multiple keys, such as the use of a shift key along with one of the ten keys, to essentially expand the 10 keys functionality into a 20 key functionality where each key, in essence, has two potential values. Here, the number of possible unique keys is expanded from the number of available unique passwords available with 10 keys to the expanded number of available unique passwords available with the 20 keys. Each of such proposed designs, including the 10 or the 20 key designs, have the common feature of having the available number of components being limited in some manner to the number of input keys available on the device. It should be recognized that as the number of potential key combination increases, and/or the number of digits used in a password increases, so increases the problems associated with password recognition as experienced by users of such devices.

There currently exists other password mechanisms that provide relatively robust password input capabilities where, for example, such mechanisms allow for the entry of a extensive range of ASCII characters. One such password mechanism includes the use of multitap functionality. With multitap a key has the potential of representing multiple values, where, for example, a key may have displayed on its surface the values or components "2 abc." Here, the user can operate the personal computing device by pressing the "2 abc" key one or more times to select the desired letter or number. For example, the 2 key is pressed once for the letter "a," twice for "b," three times for c and four times for the number "2". It is not uncommon for such multitap password mechanisms to also include functionality that provides for detecting a user's attempt to input consecutive letters on the same key.

An example is the word "no," because both "n" and "o" are on the 6 key ("6 nmo"), a user must press the 6 key two times to enter the letter "n," wait for the system to timeout, and then press the 6 key three more to enter the letter "o." Another known approach is to press a special key to skip the timeout, thus allowing direct entry of the next character using the same key. Many of the multitap methods are known to be widely used in hand-held devices. However, multitap method is typically viewed to be a slow and inefficient way to enter text and is generally known to be disliked by users. Here, in addition to the difficulties raised by adding additional characters, numbers, etc., that can make up any particular digit/component of a password, namely, the increased number of potential digit combinations also increases the difficulty for the user to remember which combination was recorded as any particular password, there is also introduced the difficulties and drawbacks of using a multitap method that requires slow and numerous key presses to achieve a relatively small length password combination.

A variety of modern password schemes also introduce factors that further increase the likelihood that users will be unable to recall their passwords. For example, many modern password schemes require users to change their passwords periodically, where users are forced to re-memorize new passwords for each of such password changes. Such frequent changes in passwords increase the likelihood that such users will not remember such newly changed passwords. Further, in is also currently not uncommon for users to have multiple passwords across many systems also increasing the likelihood that a user may not recall one or more passwords for any one or more particular systems.

At least one known approach to assist users in their ability to remember lengthy passwords is the use of password schemes based on graphics-based passwords rather than text-based passwords. In one known system a graphical password scheme operates to display a scene on a devices screen, where the user, using a stylus, connects one or more of the objects displayed on the screen, where it is the unique pattern generated by the user connection of the objects that is recorded as the password. Such systems provide the benefit of utilizing a graphics-based password, which are arguably easier for users to recall than text-based password, but such systems have the limitations, including being only graphically based, (i.e., cannot be entered in a text-based form), where such limitations include requiring: the use of an interactive screen, the use of a relatively high resolution screen known to be not typically suitable for resource constrained devices, the display objects on a graphical display that are not part of the password (i.e., those objects displayed on the screen, but not otherwise used by the user when connections are drawn between other objects), and the problem of having such graphical passwords stolen by nearby individuals viewing the screen as the password is displayed or entered.

Accordingly it would be advantageous to provide password schemes for computing devices that includes features that provide for the use of graphical features of passwords in a manner that would assist the recollection of passwords. It would also be advantageous to provide a new system that does not require an exclusive choice be made between graphical based passwords and text based passwords. In addition, it would also be advantageous to provide graphically enabled password schemes that do not require the use of interactive screens for the inputting of such passwords. It would also be advantageous to provide graphically enabled password schemes that do not require the use of high resolution screens. It would also be advantageous to provide graphically enabled password schemes that limit the items displayed on a screen to those items that directly correspond to parts or components of the password. An additional advantage would be to provide a password scheme that provides a graphical mode in conjunction with an ability to prevent "shoulder surfing" of passwords.

SUMMARY

Embodiments disclosed herein address the above stated needs including, for example, one or more embodiments, in which methods, software and apparatus, are used to provide a mechanism to authenticate the user via a strong password. At least one embodiment includes associating unique non-descriptive graphical features with unique text-based characters. Such embodiment also includes receiving in sequence, a plurality of text-based characters. Such embodiment also includes displaying in sequence, in accordance with a sequence scheme, the non-descriptive graphical features associated with the plurality of text-based characters. The embodiment operates such that wherein the password, including text-based characters, may be deciphered from both the display of the non-descriptive graphical features associated with the plurality of text-based characters and the sequence scheme.

At least one embodiment includes logic configured to associate unique non-descriptive graphical features with unique text-based characters. Such embodiment also includes logic configured to receive in sequence, a plurality of text-based characters. Such embodiment also includes logic configured to display in sequence, in accordance with a sequence scheme, the non-descriptive graphical features associated with the plurality of text-based characters. The embodiment also includes logic configured to process the plurality of text-based characters as the password. Further, the embodiment operates wherein the password, including text-based characters, may be deciphered from both the display of the non-descriptive graphical features associated with the plurality of text-based characters and the sequence scheme.

At least one embodiment includes code operable to associate unique non-descriptive graphical features with unique text-based characters. Such embodiment also includes code operable to receive in sequence, a plurality of text-based characters. The embodiment also includes code operable to display in sequence, in accordance with a sequence scheme, the non-descriptive graphical features associated with the plurality of text-based characters. The embodiment also includes code operable to process the plurality of text-based characters as the password. Further, the embodiment operates wherein the password, including text-based characters, may be deciphered from both the display of the non-descriptive graphical features associated with the plurality of text-based characters and the sequence scheme.

At least one embodiment includes means for associating unique non-descriptive graphical features with unique text-based characters. Such embodiment also includes means for receiving in sequence, a plurality of text-based characters. Such embodiment also includes means for displaying in sequence, in accordance with a sequence scheme, the non-descriptive graphical features associated with the plurality of text-based characters. In addition, the embodiment also includes means for processing the plurality of text-based characters as the password. In addition, such embodiment operates wherein the password, including text-based characters, may be deciphered from both the display of the non-descriptive graphical features associated with the plurality of text-based characters and the sequence scheme.

At least one advantage of at least one embodiment includes the use of password schemes that provide for the use of graphical password features that assist in the recollection of passwords. Another advantage is the option to combine graphical and text based password schemes. In addition, another advantage includes the providing of a graphically enabled password scheme that does not require the use of interactive screens for the inputting of passwords. Another advantage includes the providing of a graphically enabled password scheme that does not require the use of high resolution screens. Another advantage of at least one embodiment is to provide a graphically enabled password schemes that limits the items displayed on a screen to those items that directly correspond to parts or components of the password. An additional advantage of at least one embodiment is to provide a password scheme that provides a graphical mode in conjunction with text-based character mode in a manner that reduces the threat of shoulder surfing of passwords.

Other aspects, advantages, and features of the present invention will become apparent after review of the entire application, including the following sections: Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein:

FIG. 4 is a diagram illustrating one embodiment's display including the non-descriptive graphical features as produced in conjunction with corresponding text-based password components;

FIG. 5 is a diagram illustrating one embodiment's display including the non-descriptive graphical features as produced in conjunction with corresponding text-based password components;

FIG. 6 is a diagram illustrating one embodiment's display including the non-descriptive graphical features as produced in conjunction with corresponding text-based password components;

FIG. 7 is a diagram illustrating one embodiment's display including the non-descriptive graphical features as produced in conjunction with corresponding text-based password components;

DETAILED DESCRIPTION

Figure 1:
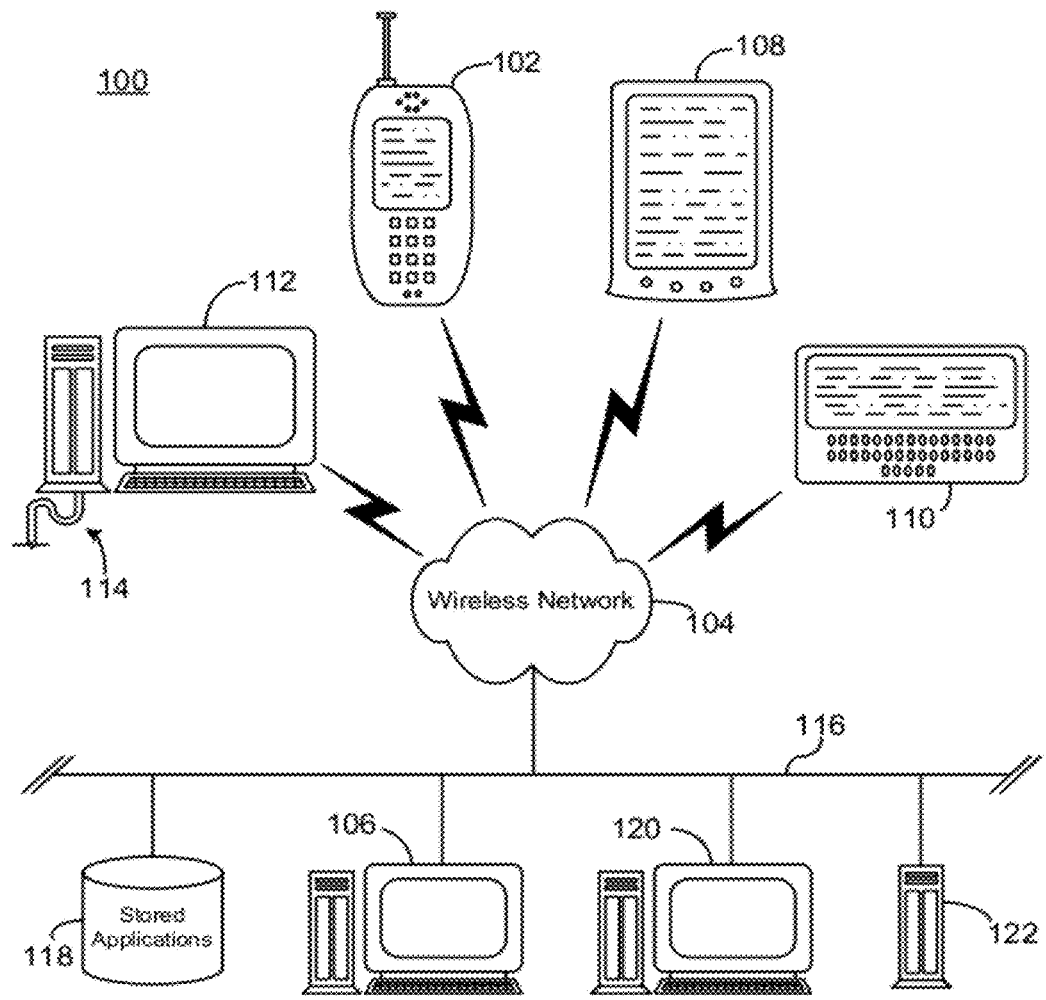
FIG. 1 is a high level diagram of one embodiment of a system using non-descriptive graphical features in conjunction with text-based password schemes.

The word "exemplary" is used herein to mean "serving as an example, instance, or illustration." Any embodiment described herein as "exemplary" is not necessarily to be construed as preferred or advantageous over other embodiments. Further, many embodiments are described in terms of sequences of actions to be performed by, for example, elements of a computing device. It will be recognized that various actions described herein could be performed by specific circuits (e.g., application specific integrated circuits (ASICs)), by program instructions being executed by one or more processors, or by a combination of both. Further, the embodiments described herein can additionally be considered to be embodied entirely within any form of computer readable storage medium having stored therein a corresponding set of computer instructions that upon execution would cause an associated processor to perform the functionality described herein. Thus, the various aspects of the claimed subject matter may be embodied in a number of different forms, all of which have been contemplated to be within the scope of such claimed subject matter. In addition, for each of the embodiments described herein, the corresponding form of any such embodiments may be described herein as, for example, "logic configured to" perform a certain action or "code operable to" perform the described action.

The following detailed description describes methods, systems, software and apparatus to provide non-descriptive graphical features in conjunction with text-based password schemes. In at least one embodiment a personal computing device operates to receive in sequence, a plurality of text-based characters, and in response, operates to display in sequence, and in accordance with a sequence scheme, the non-descriptive graphical features associated with the plurality of text-based characters. In such embodiment the password, including text-based characters, may be deciphered using a minimum of two items, one item being the display of the non-descriptive graphical features associated with the plurality of text-based characters, and the second item being the sequence scheme used to generate the display.

In one or more embodiments, the system used to provide non-descriptive graphical features in conjunction with text-based password schemes operates in conjunction with a runtime environment (API) executing on the personal computing device. One such runtime environment (API) is what is to be a new version of the Binary Runtime Environment for Wireless™ (BREW™) software platform developed by QUALCOMM, Inc., of San Diego, Calif. In at least one embodiment in the following description, the system used to provide non-descriptive graphical features in conjunction with text-based password schemes is implemented on a personal computing device executing a runtime environment (API), such as a newly contemplated, not publicly available, version of the BREW™ software platform. However, one or more embodiments of the system used to provide non-descriptive graphical features in conjunction with text-based password schemes are suitable for use with other types of runtime environments (APIs) that, for example, operate to control the execution of applications on wireless client communication devices.

FIG. 1 illustrates a block diagram of one exemplary embodiment of system 100 for providing non-descriptive graphical features in conjunction with text-based password schemes, such as cellular telephone 102, in communication across a wireless network 104 with at least one application download server 106 that selectively transmits software applications and components to wireless devices across a wireless communication portal or other data access to the wireless network 104. As shown here, the wireless device can be a cellular telephone 102, a personal digital assistant 108, a pager 110, which is shown here as a two-way text pager, or even a separate computer platform 112 that has a wireless communication portal, and may otherwise have a wired connection 114 to a network or the Internet. The inventive system can thus be performed on any form of remote devices including a wireless communication portal, including without limitation, wireless modems, PCMCIA cards, access terminals, personal computers, access terminals, telephones without a display or keypad, or any combination or sub-combination thereof.

The application download server 106 is shown here on a network 116 with other computer elements in communication with the wireless network 104. There is a second server 120 and a stand-alone server 122, and each server can provide separate services and processes to the wireless devices 102, 108, 110, 112 across the wireless network 104. There is preferably also at least one stored application database 118 that holds the software applications that are downloadable by the wireless devices 102, 108, 110, 112. Different embodiments are contemplated that locate logic to perform a portion of operations associated with providing non-descriptive graphical features in conjunction with text-based password schemes at any one or more of the application download server 106, second server 120 and stand-alone server 122.

Figure 2:
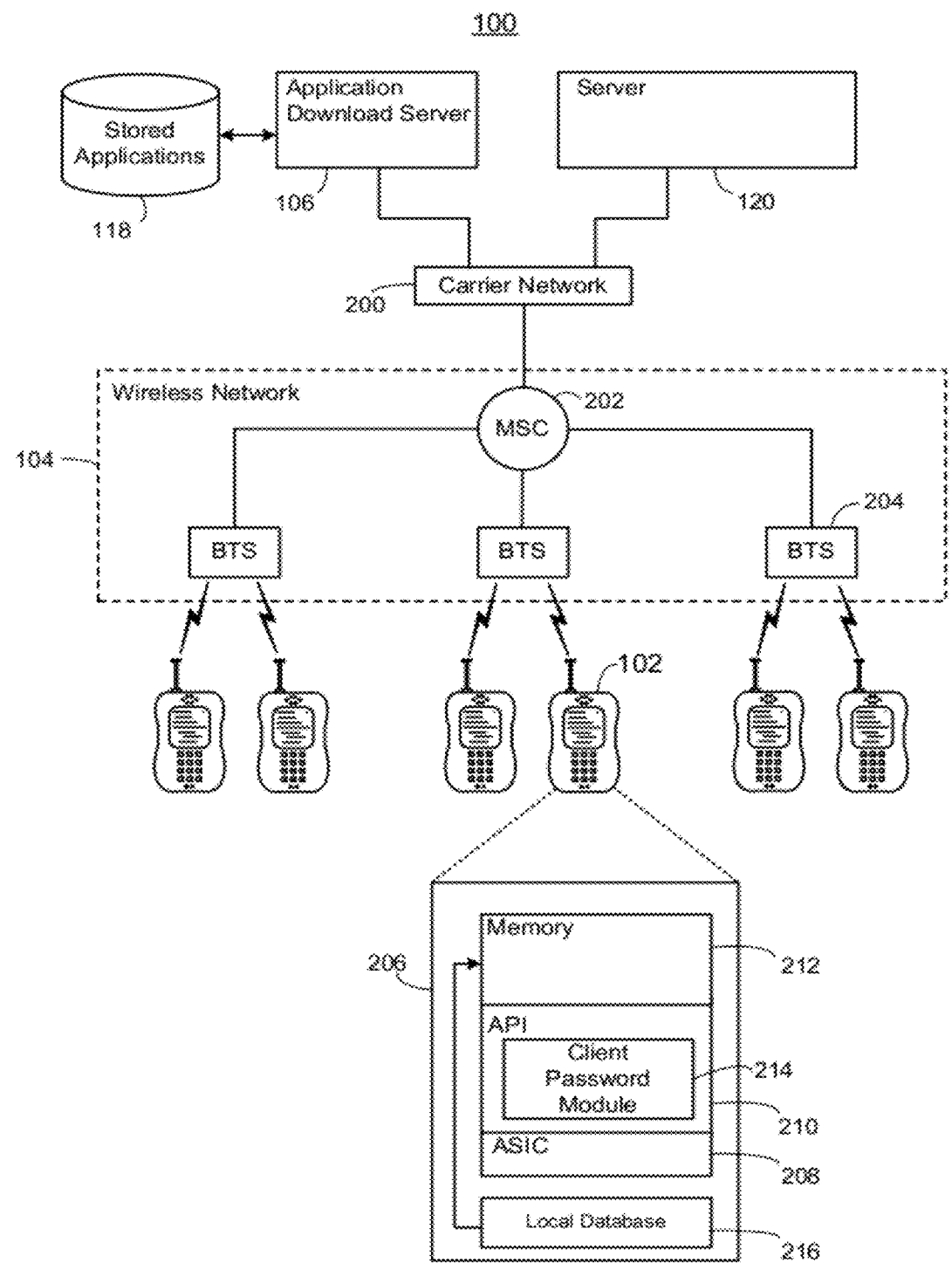
FIG. 2 is a semi-high level diagram of one embodiment of a system using non-descriptive graphical features in conjunction with text-based password schemes.

In FIG. 2, a block diagram is shown that more fully illustrates system 100, including the illustration of the components of the wireless network 104 and interrelation between such elements. As shown, the system 100 is merely exemplary and can include any system whereby remote modules, such as wireless client communication devices 102, 108, 110, 112 communicate over-the-air between and among each other and/or between and among components connected via a wireless network 104, including, without limitation, wireless network carriers and/or servers. The application download server 106 and the stored applications database 118, along with any other servers such as server 120, which are needed to provide cellular telecommunication services, communicate with a carrier network 200 through a data link, such as the Internet, a secure LAN, WAN, or other network.

The carrier network 200 operates to control messages (sent as data packets) sent to a messaging service controller ("MSC") 202. The carrier network 200 communicates with the MSC 202 by a network, the Internet and/or POTS ("plain ordinary telephone system"). Typically, the network or Internet connection between the carrier network 200 and the MSC 202 transfers data, and the POTS operates to transfer voice information. The MSC 202 is connected to multiple base stations ("BTS") 204. In a similar manner to the carrier network 200, the MSC 202 is typically connected to the BTS 204 by both the network and/or Internet for data transfer and is typically connected to the POTS for voice information. The BTS 204 ultimately broadcasts messages wirelessly to the wireless devices, such as cellular telephone 102, by short messaging service ("SMS"), or other over-the-air methods known in the art.

The wireless device, (here a personal computing device), such as cellular telephone 102, has a computer platform 206 that can receive and execute software applications transmitted from the application download server 106. In some embodiments such software applications are loaded onto the wireless device by other means than from being loaded from the application download server. The computer platform 206 includes an application-specific integrated circuit ("ASIC" 208), or other processor, microprocessor, logic circuit, or other data processing device. The ASIC 208 is installed at the time of manufacture of the wireless device and is not normally upgradeable. The ASIC 208 or other processor executes the application programming interface ("API") 210 layer that interfaces with any resident programs in the memory 212 of the wireless device. The memory 212 can be comprised of read-only or random-access memory (RAM and ROM), EPROM, flash cards, or any memory common to computer platforms. The API 210 also includes a client password module 214 containing logic configured to provide non-descriptive graphical features in conjunction with a text-based password scheme. The computer platform 206 also includes a local database 216 that can hold applications not actively used in memory 212. The local database 216 is typically a flash memory cell, but can be any secondary storage device as known in the art, such as magnetic media, EPROM, optical media, tape, or soft or hard disk.

The wireless client communication device, such as cellular telephone 102, accordingly downloads one or more software applications, such as games, news, stock monitors, and the like, from the application download server 106 and holds the application on the local database 216 when not in use, and uploads stored resident applications on the local database 216 to memory 212 for execution on the API 210 when so desired by the user. Further, the communications over the wireless network 104 are performed in a secure manner, at least in part, because of the operation of the client password module 214 where non-descriptive graphical features are used in conjunction with text-based password schemes. The present inventive system and method provides the use of non-descriptive graphical features in conjunction with a text-based password scheme, as is further described herein.

Figure 3:
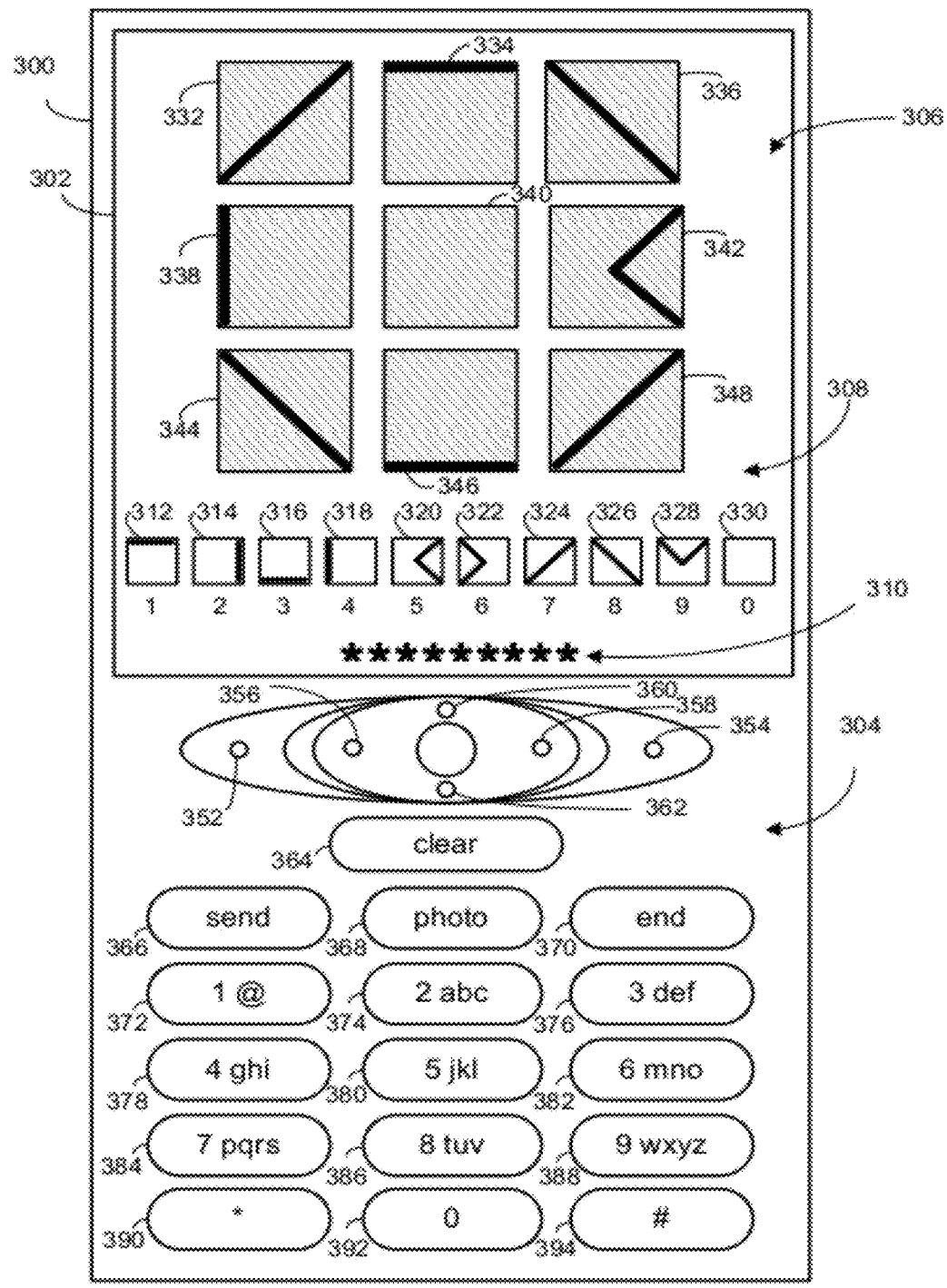
FIG. 3 is a block diagram of one embodiment of a personal computing device as used in a system using non-descriptive graphical features in conjunction with text-based password schemes.

FIG. 3 illustrates one exemplary embodiment of a personal computing device 300 including functionality providing non-descriptive graphical features in conjunction with text-based password schemes. The "non-descriptive" aspect of the graphical features means that the graphics displayed in relation to a corresponding text-based character are not, on their face, a representation of the text-based character. For example, if the text-based character is "r" then the non-descriptive graphical representation corresponding to such character would not be a graphical representation of "r," "R," ",", etc. However, a non-descriptive representation of the character "r" could be, for example, a graphic representation of the planet Mercury. A text-based character include alphanumeric-type characters (including letters, numbers, punctuation marks, and other symbols) typically available found on known keyboard entry mechanisms. Some examples of text-based characters include: "a," "A," "*," "1," ">," and "%."

As shown, the personal computing device 300 includes a display 302 and input mechanisms 304. The display 302 further includes a group of graphical features 306, a pallet of potential graphical features 308 and their associated text-based counterparts and a hidden password display 310. The group of graphical features 306 includes individual graphical features that individually correspond to individual text-based characters of a password and where such individual graphic features together form an overall image made up of the sum of the graphical features 306. Although in the displayed embodiment the range of graphical features 306 include the limited set of possible graphical features 312, 314, 316, 318, 320, 322, 324, 326, 328 and 330, and are selected from the pallet of potential graphic features 308, other embodiments provide for altogether different graphical features, and other embodiments also provide for graphical features that are more or less numerous than that shown in the figure, and further, other such embodiments provide for graphical features that correspond to text-based characters other than those shown in the embodiment (e.g., shown is 0-9).

The pallet of potential graphical features 308 includes different graphical features 306 for a corresponding text-based character. For example, graphical feature 332 (pallet item 324) is a graphical representation that resembles the forward slash text-based character "/" within a square. Here, in this example, the corresponding or associated text-based character is the number "7." As shown here, and according to rules of the corresponding sequence scheme, each of the graphical features 308 contain a continuous segment that begins at a corner of a square and ends at another corner of the same square, or such graphical feature 308 is blank or has no segment therein. The sequence scheme for the current embodiment further contains the following rules: the graphical features 306 that make up the overall display include a 3.times.3 matrix of squares. Each square can have its color chosen, the color of pen used for the segments in the graphical features 306 can be selectively chosen, the contents of the overall display are provided in the following sequence: the color is chosen from a pallet 308 containing individual graphical features that allow a selection from a variety of background colors that correspond to an associated text-based character, next, the pen color is chosen from a pallet 308 containing individual graphical features that allow a selection from a variety of pen colors that also correspond to an associated text-based character, next, beginning at the upper left hand corner square (332) and moving left to right, row by row, (e.g., continuing with the sequence 334, 336, 338, 340, 342, 344, 346 and 348), each of the graphical features 306 are populated with the contents of one of the graphical features 312, 314, 316, 318, 320, 322, 324, 326, 328 and 330 from the pallet 308. Further, the sequence scheme further includes the rule that the overall display of the graphical features 306 must include an outline of an image, as provided by the continuous segments, such that an overall image is shown that is fully bounded.

As reflected in the current embodiment the graphical features 306, as shown in the overall display, reflect the satisfaction of the rules of the described sequence scheme wherein the following inputs were received: after a display showing a series of colors as background choices in a corresponding pallet 308, input was received selecting a background color of light green where light green was associated with the number "4," next, after a display showing a series of colors as pen color choices in a corresponding pallet 308, input was received selecting a pen color of black where black was associated with the number "1," next, after a display showing the series of continuous segment patterns as reflected in the pallet 308 shown as having the graphical features 312, 314, 316, 318, 320, 322, 324, 326, 328 and 330 as shown in the figure, input was received first selecting the graphical feature 324 associated with the text-based character "7," input was received next selecting the graphical feature 312 associated with the text-based character "1," input was received next selecting the graphical feature 326 associated with the text-based character "8," input was received next selecting the graphical feature 318 associated with the text-based character "4," input was received next selecting the graphical feature 330 associated with the text-based character "0," input was received next selecting the graphical feature 320 associated with the text-based character "5," input was received next selecting the graphical feature 326 associated with the text-based character "8," input was received next selecting the graphical feature 316 associated with the text-based character "3," finally input was received associated with right hand corner square 348 selecting the graphical feature 324 associated with the text-based character "7." As each consecutive password component or digit was chosen, an additional asterisk was displayed in the hidden password display 310, until an eleven digit password was completed. From left to right, the contents of the password corresponding to the hidden password display 310, according to the overall graphical features 306 and according to the sequence scheme of the present embodiment, is as follows: "41718405837."

Although the present embodiment shows the use of a sequence scheme that includes the use of a matrix of squares that are populated with continuous segments in a right to left, top to bottom scheme where a resulting bounded image is required, other sequence schemes are completely different than such scheme. There are as many possible sequence schemes as there picture contents, different methods of assembling sub-graphical features into an overall graphical display, and as many other rules and procedures that are conceivable that relate to the building of an overall graphical display. However, because so many different possible sequence schemes and their associated rules are possible, and because different such sequence schemes can be applied to an identical graphical feature, and result in different corresponding text-based passwords, it is typical that such systems operation includes that both an overall graphic display be known, as well as the specific corresponding sequence scheme, before such combination is useful to a user in recalling a text-based password based on an overall graphics display. For example, with regard to the present figure, even if one knew of the text-based characters that were associated with each of the graphical features, without the sequence scheme one would not know the sequence such text-based characters should be assembled under.

One advantage of the claimed subject matter herein is to assist users in remembering their passwords by providing a graphical feature that corresponds to a text-based password. Here, the advantages include all the advantages with using text-based passwords, such as all the known means of inputting and handling such text-based passwords, as well as the advantages provided by the function that graphics play in allowing users to recall associated passwords. Another advantage over pure graphics based schemes, besides those of not requiring touch-based screens or high resolution schemes, is that because there is a corresponding text-based password associated with a graphical feature, that such information can be easily provided via a voice communication from a technical support representative as to the contents of the password (i.e., its easier to say "349" rather than "moon" "in the right hand corner" with a "brown horse.")

The input received as described above with respect to the current figure is received through the one or more input keys found in the input mechanism 304. Although the present embodiment is specifically described as utilizing numeric input from particular keys, one or more embodiments may interpret any particular input key or input key combinations as input representing a text-based character. The device as shown has twenty two different individual keys 352, 354, 356, 358, 360, 362, 364, 366, 368, 370, 372, 374, 376, 378, 380, 382, 384, 386, 388, 390, 392 and 394. Other embodiments utilize more or less input keys, and provide for the use of multiple key combinations in identifying associated text-based characters and displaying associated individual graphical features.

FIG. 4 illustrates one exemplary embodiment of an overall graphical display 400 as generated using the sequence scheme of the embodiment of the previous two figures, where, the graphical squares 336 and 342 have different (different from FIG. 3) corresponding specific graphical features and associated text-based characters or digits. Here, the upper right hand square contains the graphical feature 318 associated with the text-based character "4" and the middle right hand square contains the graphical feature 326 associated with the text-based character "8." As a result, the corresponding password is "41714408837."

FIG. 5 illustrates one exemplary embodiment of an overall graphical display 500 as generated using the sequence scheme of the embodiment of the previous three figures, where, the background color and pen color have different (different from FIG. 4) corresponding colors and associated text-based characters or digits. Here, the background color is dark green and is associated with the text-based character "6" and the pen color is light blue and is associated with the text-based character "3." As a result, the corresponding password is "63714408837."

FIG. 6 illustrates one exemplary embodiment of an overall graphical display 600 as generated using the sequence scheme of the embodiment of the previous four figures, where, the background color and graphical squares 334, 336, 342, 344 and 346 have different (different from FIG. 3) corresponding background colors and specific graphical features and associated text-based characters or digits. Here, the background color is white and is associated with text-based character 2. In addition, the upper middle square 334 contains the graphical feature 326 associated with the text-based character "8," the upper right hand square 336 contains the graphical feature 316 associated with the text-based character "3," the middle right hand square 342 contains the graphical feature 314 associated with the text-based character "2," the lower left hand square 344 contains the graphical feature 328 associated with the text-based character "9" and the lower middle square 346 contains the graphical FIG. 326 associated with the text-based character "8." As a result, the corresponding password is "21783402987."

FIG. 7 illustrates one exemplary embodiment of an overall graphical display 700 as generated using the sequence scheme of the embodiment of the previous five figures, where, the background color and graphical squares 342 and 348 have different (different from FIG. 3) corresponding background colors and specific graphical features and associated text-based characters or digits. Here, the background color is white and is associated with text-based character 2. In addition, the middle right hand square 342 contains the graphical feature 324 associated with the text-based character "7," the lower right hand square 348 contains the graphical feature 318 associated with the text-based character "4." As a result, the corresponding password is "21718407834."

Figure 8:
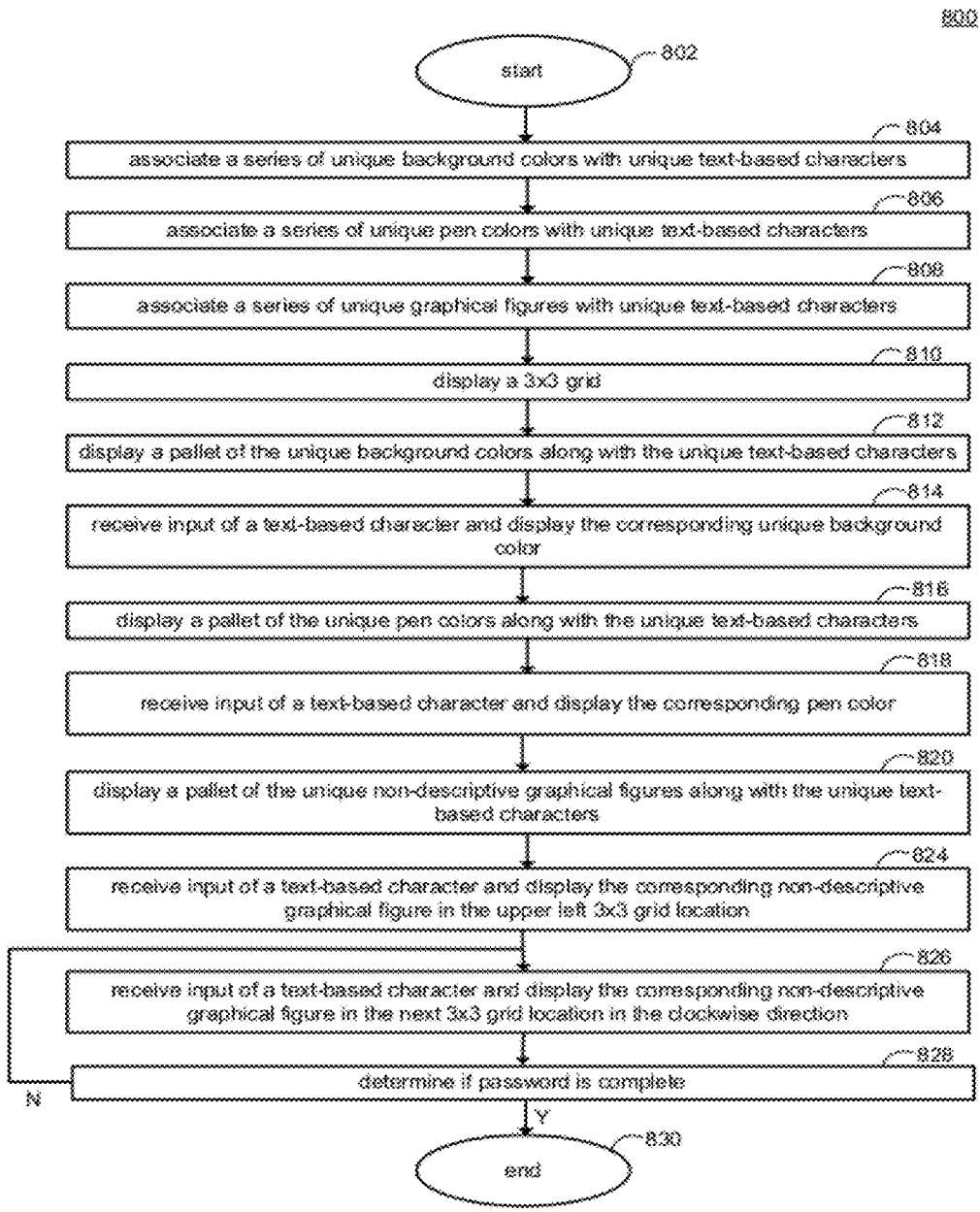
FIG. 8 is a flowchart illustrating one embodiment of a system using non-descriptive graphical features in conjunction with text-based password schemes.

FIG. 8 illustrates one exemplary embodiment of one method of providing non-descriptive graphical features in conjunction with text-based password schemes. The method 800, after beginning with start step 802, continues to step 804 the system operates to associate a series of unique background colors with unique text-based characters. Next, in step 806, the system operates to associate a series of unique pen colors with unique text-based characters. Following, in step 808, the system operates to associate a series of unique graphical figures with unique text-based characters. In step 810, the system operates to a display a 3.times.3 grid. In step 812, the system operates to display a pallet of the unique background colors along with the unique text-based characters. Following step 812, is step 814 in which the system operates to receive input of a text-based character and display the corresponding unique background color. Next, in step 816, the system operates to display a pallet of the unique pen colors along with the unique text-based characters. In step 818 the system operates to receive input of a text-based character and display the corresponding pen color. In step 820 the system operates display a pallet of the unique non-descriptive graphical figures along with the unique text-based characters. Next, in step 824 the system operates to receive input of a text-based character and display the corresponding non-descriptive graphical figure in the upper left 3.times.3 grid location. In step 826 the system operates to receive input of a text-based character and display the corresponding non-descriptive graphical figure in the next 3.times.3 grid location in the clockwise direction. After step 826 the system, in step 828 operates to determine if password is complete. If in step 828 it is determined that the password is complete, then the method ends with end step 830. However, if in step 828 it is determined that the password is not yet complete, then the method returns to step 826 where the system performs the operations as described above with respect to such step.

Figure 9:
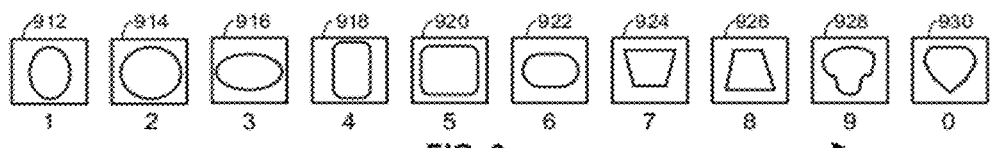
FIG. 9 is diagram illustration a pallet associated with one embodiment used in a system using non-descriptive graphical features in conjunction with text-based password schemes.

FIG. 9 illustrates one alternative embodiment of a personal computing device 300 including functionality providing non-descriptive graphical features in conjunction with text-based password schemes. Such alternative embodiment is also described in the following four figures and is generally directed towards a system in which the graphical features are such that when accumulated a face-like form is displayed on the screen. One advantage of this and other like embodiments is the ability to take advantage of facial recognition abilities known to be possessed by users generally. For explanatory purposes, the embodiment shown is of limited complexity, and it is expected that many like embodiments would include additional graphical features, such as more and complex facial features, headwear, jewelry, background, etc., that would provide a more robust password scheme.

More specifically, the personal computing device 300 includes a pallet of potential graphical features 900 and their associated text-based counterparts. The group of graphical features (see FIG. 13) includes individual graphical features that individually correspond to individual text-based characters of a password and where such individual graphic features together form an overall image including the graphical features selected from the pallet of potential graphical features 900. As shown, the graphical feature contained in pallet item 912 represents an elongated head shape. Pallet item 914 contains a graphical feature representing a full round head shape. Pallet item 916 contains a graphical feature representing a wide oblong head shape. Pallet item 918 contains a graphical feature representing a long rectangular head shape. Pallet item 920 contains a graphical feature representing a full rectangular head shape. Pallet item 922 contains a graphical feature representing another wide oblong head shape. Pallet item 924 contains a graphical feature representing a widening head shape. Pallet item 926 contains a graphical feature representing a narrowing head shape. Pallet item 928 contains a graphical feature representing a narrow jaw head shape. Pallet item 930 contains a graphical feature representing a pointed chin shape. Although in the displayed embodiment the pallet of potential graphical features 900 include the limited set of possible graphical features 912, 914, 916, 918, 920, 922, 924, 926, 928 and 930, other embodiments provide for altogether different graphical features, and other embodiments also provide for graphical features that are more or less numerous than that shown in the figure, and further, other such embodiments provide for graphical features that correspond to text-based characters other than those shown in the embodiment (e.g., shown is 0-9).

Figure 10:
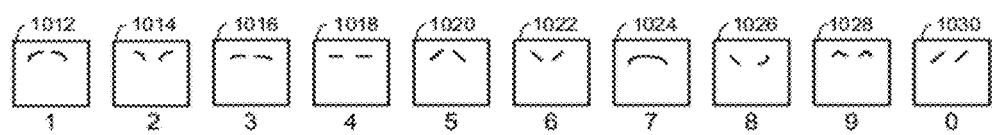
FIG. 10 is diagram illustration a pallet associated with one embodiment used in a system using non-descriptive graphical features in conjunction with text-based password schemes.

FIG. 10 illustrates one alternative embodiment of a personal computing device 300 including functionality providing non-descriptive graphical features in conjunction with text-based password schemes. Such alternative embodiment represents a portion of the alternative embodiment described FIGS. 9-13. More specifically, the personal computing device 300 includes a pallet of potential graphical features 1000 and their associated text-based counterparts. The group of graphical features (see FIG. 13) includes individual graphical features that individually correspond to individual text-based characters of a password and where such individual graphic features together form an overall image including graphical features selected from the pallet of potential graphical features 1000. As shown, the graphical feature contained in pallet item 1012 representing one particular eye brow pattern. Likewise, the remaining pallet items 1014, 1016, 1018, 1020, 1022, 1024, 1024, 1028 and 1030, represent other unique eye brow patterns and are associated to corresponding unique text-based characters. Although in the displayed embodiment the pallet of potential graphical features 1000 include the limited set of possible graphical features in pallet items 1012, 1014, 1016, 1018, 1020, 1022, 1024, 1024, 1028 and 1030, other embodiments provide for altogether different graphical features, and other embodiments also provide for graphical features that are more or less numerous than that shown in the figure, and further, other such embodiments provide for graphical features that correspond to text-based characters other than those shown in the embodiment (e.g., shown is 0-9).

Figure 11:
FIG. 11 is diagram illustration a pallet associated with one embodiment used in a system using non-descriptive graphical features in conjunction with text-based password schemes.

FIG. 11 illustrates one alternative embodiment of a personal computing device 300 including functionality providing non-descriptive graphical features in conjunction with text-based password schemes. Such alternative embodiment represents a portion of the alternative embodiment described FIGS. 9-13. More specifically, the personal computing device 300 includes a pallet of potential graphical features 1100 and their associated text-based character counterparts. The group of graphical features (see FIG. 13) includes individual graphical features that individually correspond to individual text-based characters of a password and where such individual graphic features together form an overall image including the graphical features selected from the pallet of potential graphical features 1100. As shown, the graphical feature contained in pallet item 1112 representing one particular nose shape. Likewise, the remaining pallet items 1114, 1116, 1118, 1120, 1122, 1124, 1124, 1128 and 1130, represent other unique nose shapes and are associated to corresponding unique text-based characters. Although in the displayed embodiment the pallet of potential graphical features 1100 include the limited set of possible graphical features in pallet items 1112, 1114, 1116, 1118, 1120, 1122, 1124, 1124, 1128 and 1130, other embodiments provide for altogether different graphical features, and other embodiments also provide for graphical features that are more or less numerous than that shown in the figure, and further, other such embodiments provide for graphical features that correspond to text-based characters other than those shown in the embodiment (e.g., shown is 0-9).

Figure 12:
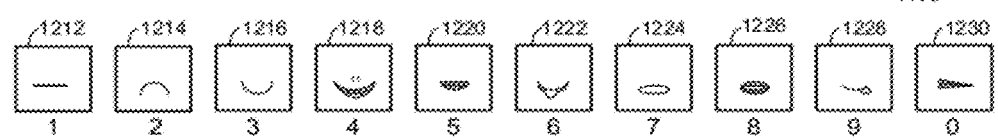
FIG. 12 is diagram illustration a pallet associated with one embodiment used in a system using non-descriptive graphical features in conjunction with text-based password schemes.

FIG. 12 illustrates one alternative embodiment of a personal computing device 300 including functionality providing non-descriptive graphical features in conjunction with text-based password schemes. Such alternative embodiment represents a portion of the alternative embodiment described FIGS. 9-13. More specifically, the personal computing device 300 includes a pallet of potential graphical features 1200 and their associated text-based character counterparts. The group of graphical features (see FIG. 13) includes individual graphical features that individually correspond to individual text-based characters of a password and where such individual graphic features together form an overall image including the graphical features selected from the pallet of potential graphical features 1200. As shown, the graphical feature contained in pallet item 1212 representing one particular mouth shape. Likewise, the remaining pallet items 1214, 1216, 1218, 1220, 1222, 1224, 1224, 1228 and 1230, represent other unique mouth shapes and are associated to corresponding unique text-based characters. Although in the displayed embodiment the pallet of potential graphical features 1200 include the limited set of possible graphical features in pallet items 1212, 1214, 1216, 1218, 1220, 1222, 1224, 1224, 1228 and 1230, other embodiments provide for altogether different graphical features, and other embodiments also provide for graphical features that are more or less numerous than that shown in the figure, and further, other such embodiments provide for graphical features that correspond to text-based characters other than those shown in the embodiment (e.g., shown is 0-9).

Figure 13:
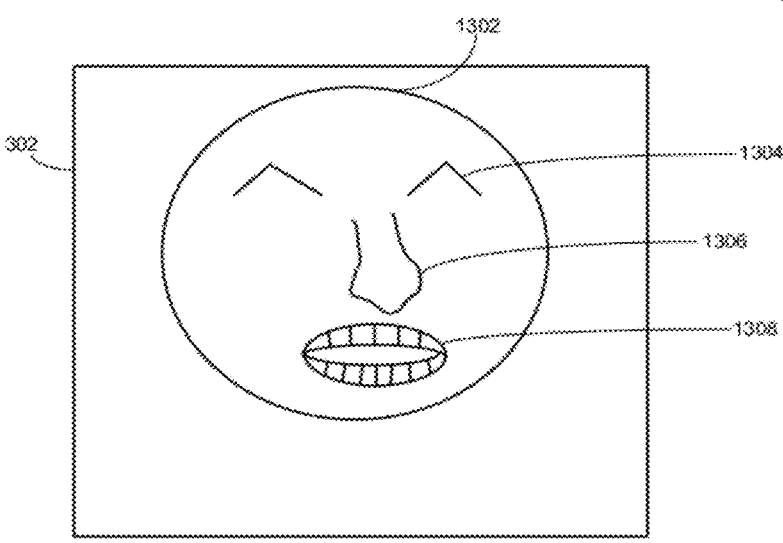
FIG. 13 is a diagram illustrating one embodiment's display including the non-descriptive graphical features as produced in conjunction with corresponding text-based password components.

FIG. 13 illustrates one alternative embodiment of a personal computing device 300 including functionality providing non-descriptive graphical features in conjunction with text-based password schemes. Such alternative embodiment represents a portion of the alternative embodiment described FIGS. 9-13. More specifically, the personal computing device 300 includes, illustrated on the display 302, an image containing a head shape 1302, an eye brow pattern 1304, a nose shape 1306 and a mouth shape 1308. The pallet of potential graphical features 900, 1000, 1100 and 1200, includes different graphical features for each corresponding text-based character. As shown here, and according to rules of the corresponding sequence scheme, the graphical features that make up the overall display are arranged in a face-forming format. As reflected in the current embodiment the graphical features, as shown in the overall display, reflect the satisfaction of the rules of the described sequence scheme wherein the following inputs were received: input was received selecting the graphical feature 914 associated with the text-based character "2," input was received next selecting the graphical feature 1028 associated with the text-based character "9," input was received next selecting the graphical feature 1124 associated with the text-based character "7," input was received next selecting the graphical feature 1226 associated with the text-based character "8." From left to right, the contents of the password, according to the overall graphical features 1202 and according to the sequence scheme of the present embodiment, is as follows: "2978."

Figure 14:
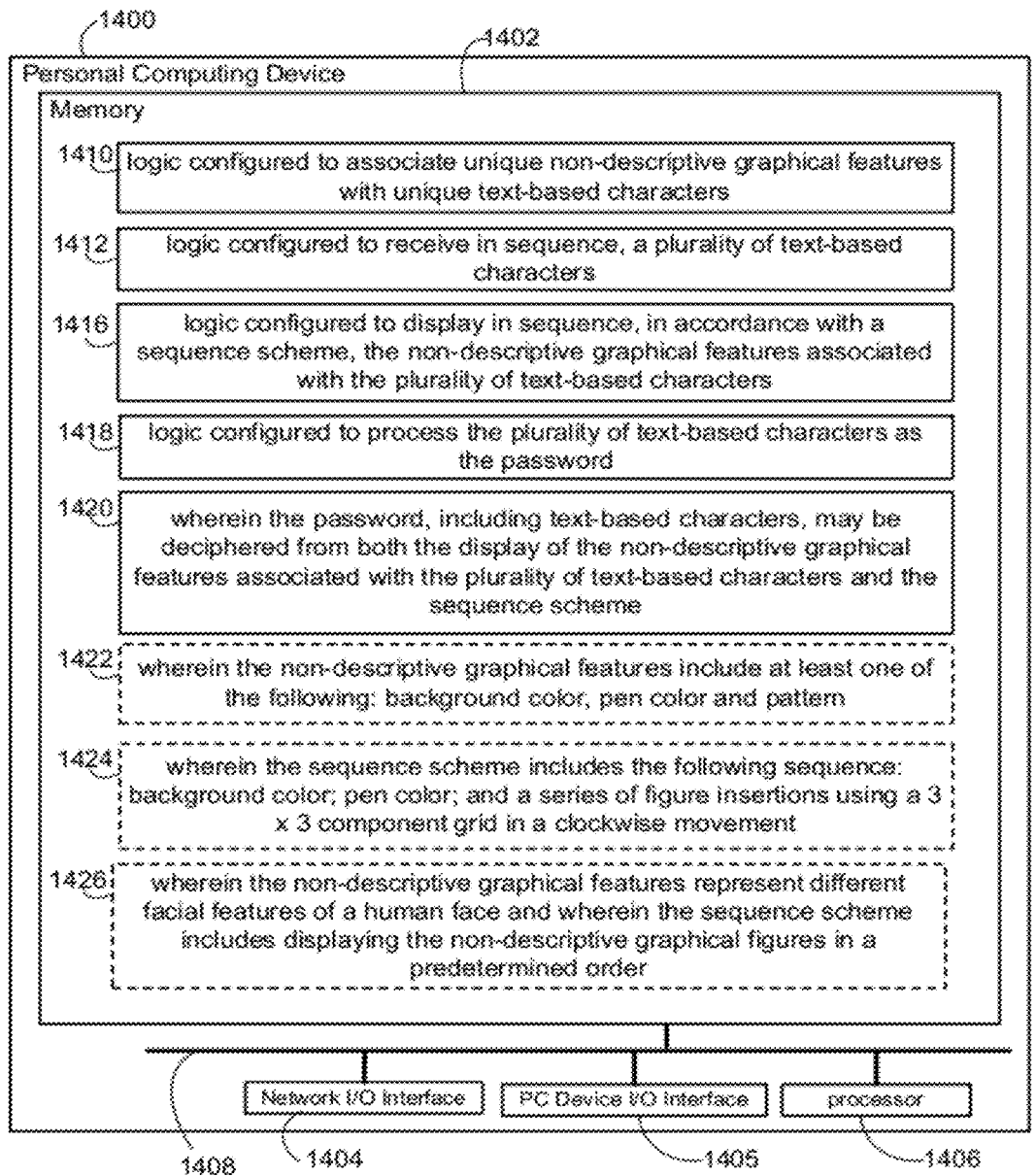
FIG. 14 is a block diagram of one embodiment of a personal computing device as used in a system using non-descriptive graphical features in conjunction with text-based password schemes.

FIG. 14 illustrates one exemplary embodiment of a personal computing device 1400 operable to use of graphical features in conjunction with password components to promote password recollection. As used herein "personal communications device" includes, for example, one or more processing circuits executing resident configured logic, where such computing devices include, for example, microprocessors, digital signal processors (DSPs), microcontrollers, portable wireless telephones, personal digital assistants (PDAs), and paging devices, or any suitable combination of hardware, software and/or firmware containing processors and logic configured to at least perform the operations described herein directed to secure communications. In at least one embodiment, the personal communications device 1400 is serviced by at least one server (typically located remotely) with respect to such personal password processing. In one embodiment such network is, at least in part, a wireless network 104. In at least one embodiment the personal computing device 1400 can be any of the wireless devices 102, 108, 110 and 112, shown and described in relation to FIG. 1.

As shown in the exemplary embodiment, the personal computing device 1400 includes memory 1402, network I/O interface 1404, PC device I/O interface 1405, processor 1406 and bus 1408. Although the memory 1402 is shown as RAM memory, other embodiments include such memory 1402 as all known types of memory that are known to provide for the storing of configured logic. In addition, although memory 1402 is shown as one contiguous unit of one type of memory, other embodiments use multiple locations and multiple types of memory as memory 1402. The network I/O interface 1404 provides input and output to devices coupled to the network via the bus 1408. The PC Device I/O interface 1405 provides input and output to the personal computing device 1400. The processor 1406 operates on instructions and data provided via the bus 1408.

Located in memory 1402 is logic (1404) configured to associate unique non-descriptive graphical features with unique text-based characters, and logic (1404) configured to receive in sequence, logic (1406) configured to display in sequence, in accordance with a sequence scheme, the non-descriptive graphical features associated with the plurality of text-based characters, and logic (1408) configured to process the plurality of text-based characters as the password. In one embodiment such processing of the plurality of text-based characters includes the storing of such text-based characters either locally or remotely. In another embodiment such processing includes sending the text-based characters as the password across the network for use in remote authentication. In yet another embodiment, the text-based characters are further processed, such as via a hash algorithm, before then sent across the network for authentication and/or further processing. In addition, the memory 1402 further includes logic (1420) wherein the password, including text-based characters, may be deciphered from both the display of the non-descriptive graphical features associated with the plurality of text-based characters and the sequence scheme.

Figure 15:
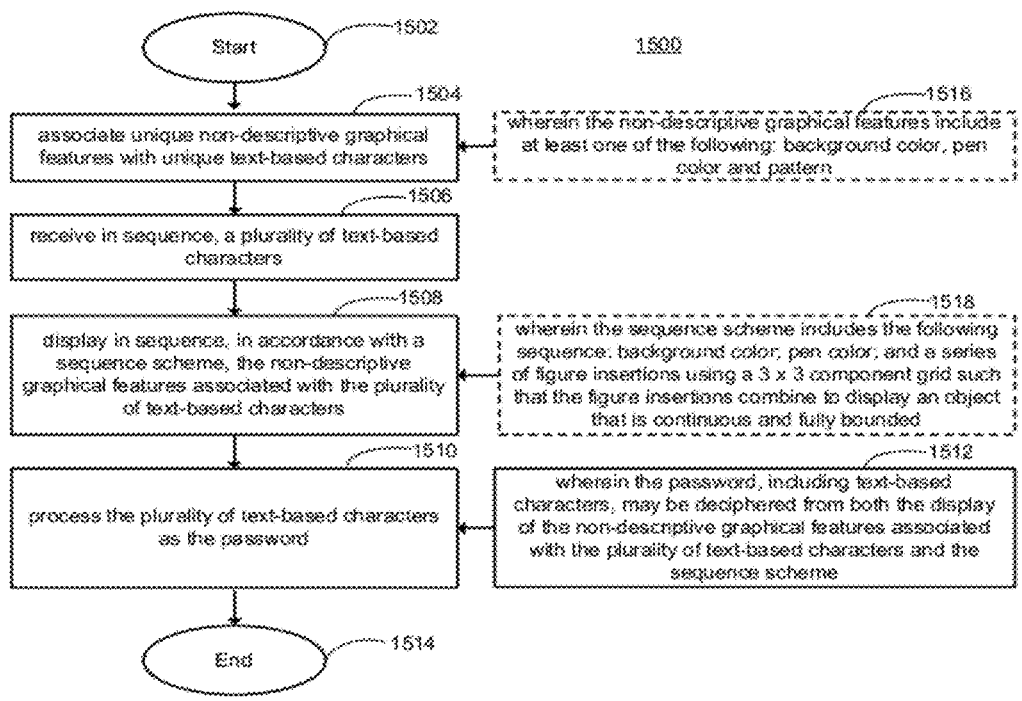
FIG. 15 is a flowchart illustrating one embodiment of a system using non-descriptive graphical features in conjunction with text-based password schemes.

At least one embodiment includes the optional logic 1422 wherein the non-descriptive graphical features include at least one of the following: background color, pen color and pattern. In addition, at least one embodiment includes optional logic 1424 wherein the sequence scheme includes the following sequence: background color; pen color; and a series of figure insertions using a 3.times.3 component grid in a clockwise movement. Further, in at least one embodiment, logic 1426 is included wherein the non-descriptive graphical features represent different facial features of a human face and wherein the sequence scheme includes displaying the non-descriptive graphical figures in a predetermined order FIG. 15 illustrates one exemplary embodiment of one method of providing non-descriptive graphical features in conjunction with text-based password schemes. The method 1500 begins, after initial step 1502, with step 1504 where the method operates to associate unique non-descriptive graphical features with unique text-based characters. Next, in step 1506, the method operates to receive in sequence, a plurality of text-based characters. In step 1508, the method operates to display in sequence, in accordance with a sequence scheme, the non-descriptive graphical features associated with the plurality of text-based characters. In step 1510 the system operates to process the plurality of text-based characters as the password. In at least one embodiment a step 1520 is provided wherein the password, including text-based characters, may be deciphered from both the display of the non-descriptive graphical features associated with the plurality of text-based characters and the sequence scheme. Following step 1510 is end step 1514.

In at least one embodiment an optional step 1516 is provided wherein the non-descriptive graphical features include at least one of the following: background color, pen color and pattern. In at least one embodiment an optional step 1518 is provided wherein the sequence scheme includes the following sequence: background color; pen color; and a series of figure insertions using a 3.times.3 component grid such that the figure insertions combine to display an object that is continuous and fully bounded.

Those of ordinary skill in the art would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a computing device or user terminal. In the alternative, the processor and the storage medium may reside as discrete components in a computing device or user terminal.

The previous description of the disclosed embodiments is provided to enable any person of ordinary skill in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for user authentication, comprising:
   displaying on a display at least one pallet illustrating associations between a series of unique non-descriptive graphical figures and corresponding unique text-based characters, wherein each text-based character corresponds to one of a plurality of keys comprising an input mechanism of the device and wherein each unique non-descriptive graphical figure is associated with a corresponding text-based character, wherein the series of unique non-descriptive graphical figures comprises a series of unique background colors and a series of unique pen colors;
   receiving input of a text-based character corresponding to a unique non-descriptive graphical figure and displaying the non-descriptive graphical figure in a predetermined display location in accordance with a defined sequence scheme comprising rules for the order of entry of a sequence, and repeating receiving input of a text-based character corresponding to a next non-descriptive graphical figure and displaying the next non-descriptive graphical figure in a next predetermined display location in accordance with the defined sequence scheme until receipt of the sequence is complete; and
   processing the input text-based characters as a user password.

2. The method of claim 1, further comprising:
   displaying on the display of the device at least one pallet illustrating associations between a series of unique color features and corresponding unique text-based characters, wherein each text-based character corresponds to one of the plurality of keys comprising the input mechanism of the device and wherein each color feature is associated with a corresponding text-based character; and
   receiving input of a text-based character corresponding to a particular color feature.

3. The method of claim 2, wherein the color features include at least one of a background color and a pen color for the series of unique non-descriptive graphical figures.

4. The method of claim 1, wherein the defined sequence scheme further comprises:
   a rule requiring that each non-descriptive graphical figure contains a continuous segment that begins at an edge of the non-descriptive graphical figure and ends at another edge of the same non-descriptive graphical figure, or is a non-descriptive graphical figure that has no segment therein; and
   a rule requiring that an overall image of the completed sequence of non-descriptive graphical figures includes an outline of an image as provided by the continuous segments, such that the overall image that is shown is fully bounded.

5. The method of claim 1, wherein the predetermined display location is a predetermined grid location of a grid in accordance with the defined sequence scheme.

6. The method of claim 1, wherein the non-descriptive graphical figures comprise facial features.

7. A personal computing device, comprising:
   an input mechanism comprising a plurality of keys corresponding to text-based characters;
   a display;
   a memory; and
   a processor coupled to the input mechanism, display, and memory, wherein the processor is configured with processor-executable instructions to perform operations comprising:
   displaying on a display of a device at least one pallet illustrating associations between a series of unique non-descriptive graphical figures and corresponding unique text-based characters, wherein each text-based character corresponds to one of a plurality of keys comprising an input mechanism of the device and wherein each unique non-descriptive graphical figure is associated with a corresponding text-based character,
   wherein the series of unique non-descriptive graphical figures comprises a series of unique background colors and a series of unique pen colors;
   receiving input of a text-based character corresponding to a unique non-descriptive graphical figure and displaying the non-descriptive graphical figure in a predetermined display location in accordance with a defined sequence scheme comprising rules for the order of entry of a sequence, and repeating receiving input of a text-based character corresponding to a next non-descriptive graphical figure and displaying the next non-descriptive graphical figure in a next predetermined display location in accordance with the defined sequence scheme until receipt of the sequence is complete; and
   processing the input text-based characters as a user password.

8. The personal computing device of claim 7, wherein the processor is configured with processor-executable instructions to perform operations further comprising:
   displaying on the display of the device at least one pallet illustrating associations between a series of unique color features and corresponding unique text-based characters, wherein each text-based character corresponds to one of the plurality of keys comprising the input mechanism of the device and wherein each color feature is associated with a corresponding text-based character; and
   receiving input of a text-based character corresponding to a particular color feature.

9. The personal computing device of claim 8, wherein the color features include at least one of a background color and a pen color for the series of unique non-descriptive graphical figures.

10. The personal computing device of claim 7, wherein the defined sequence scheme further comprises:
    a rule requiring that each non-descriptive graphical figure contains a continuous segment that begins at an edge of the non-descriptive graphical figure and ends at another edge of the same non-descriptive graphical figure, or is a non-descriptive graphical figure that has no segment therein; and
    a rule requiring that an overall image of the completed sequence of non-descriptive graphical figures includes an outline of an image as provided by the continuous segments, such that the overall image that is shown is fully bounded.

11. The personal computing device of claim 7, wherein the predetermined display location is a predetermined grid location of a grid in accordance with the defined sequence scheme.

12. The personal computing device of claim 7, wherein the non-descriptive graphical figures comprise facial features.

13. A non-transitory processor-readable medium having stored thereon processor-executable instructions configured to cause a personal computing device processor to perform operations comprising:

displaying on a display of a device at least one pallet illustrating associations between a series of unique non-descriptive graphical figures and corresponding unique text-based characters, wherein each text-based character corresponds to one of a plurality of keys comprising an input mechanism of the device and wherein each unique non-descriptive graphical figure is associated with a corresponding text-based character, wherein the series of unique non-descriptive graphical figures comprises a series of unique background colors and a series of unique pen colors;

receiving input of a text-based character corresponding to a unique non-descriptive graphical figure and displaying the non-descriptive graphical figure in a predetermined display location in accordance with a defined sequence scheme comprising rules for the order of entry of a sequence, and repeating receiving input of a text-based character corresponding to a next non-descriptive graphical figure and displaying the next non-descriptive graphical figure in a next predetermined display location in accordance with the defined sequence scheme until receipt of the sequence is complete; and processing the input text-based characters as a user password.

14. The non-transitory processor-readable medium of claim 13, wherein the stored processor-executable instructions are configured to cause a personal computing device processor to perform operations further comprising:

displaying on the display of the device at least one pallet illustrating associations between a series of unique color features and corresponding unique text-based characters, wherein each text-based character corresponds to one of the plurality of keys comprising the input mechanism of the device and wherein each color feature is associated with a corresponding text-based character; and receiving input of a text-based character corresponding to a particular color feature.

15. The non-transitory processor-readable medium of claim 14, wherein the color features include at least one of a background color and a pen color for the series of unique non-descriptive graphical figures.

16. The non-transitory processor-readable medium of claim 13, wherein the defined sequence scheme further comprises:

a rule requiring that each non-descriptive graphical figure contains a continuous segment that begins at an edge of the non-descriptive graphical figure and ends at another edge of the same non-descriptive graphical figure, or is a non-descriptive graphical figure that has no segment therein; and a rule requiring that an overall image of the completed sequence of non-descriptive graphical figures includes an outline of an image as provided by the continuous segments, such that the overall image that is shown is fully bounded.

17. The non-transitory processor-readable medium of claim 13, wherein the predetermined display location is a predetermined grid location of a grid in accordance with the defined sequence scheme.

18. The non-transitory processor-readable medium of claim 13, wherein the non-descriptive graphical figures comprise facial features.

19. A personal computing device, comprising:

means for receiving user input comprising a plurality of keys corresponding to text-based characters;

means for displaying on a display of a device at least one pallet illustrating associations between a series of unique non-descriptive graphical figures and corresponding unique text-based characters, wherein each text-based character corresponds to one of a plurality of keys comprising an input mechanism of the device and wherein each unique non-descriptive graphical figure is associated with a corresponding text-based character, wherein the series of unique non-descriptive graphical figures comprises a series of unique background colors and a series of unique pen colors;

means for receiving input of a text-based character corresponding to a unique non-descriptive graphical figure and displaying the non-descriptive graphical figure in a predetermined display location in accordance with a defined sequence scheme comprising rules for the order of entry of a sequence, and repeating receiving input of a text-based character corresponding to a next non-descriptive graphical figure and displaying the next non-descriptive graphical figure in a next predetermined display location in accordance with the defined sequence scheme until receipt of the sequence is complete; and means for processing the input text-based characters as a user password.

20. The personal computing device of claim 19, further comprising:

means for displaying on the display of the device at least one pallet illustrating associations between a series of unique color features and corresponding unique text-based characters, wherein each text-based character corresponds to one of the plurality of keys comprising the input mechanism of the device and wherein each color feature is associated with a corresponding text-based character; and means for receiving input of a text-based character corresponding to a particular color feature.

21. The personal computing device of claim 20, wherein the color features include at least one of a background color and a pen color for the series of unique non-descriptive graphical figures.

22. The personal computing device of claim 19, wherein the defined sequence scheme further comprises:

a rule requiring that each non-descriptive graphical figure contains a continuous segment that begins at an edge of the non-descriptive graphical figure and ends at another edge of the same non-descriptive graphical figure, or is a non-descriptive graphical figure that has no segment therein; and a rule requiring that an overall image of the completed sequence of non-descriptive graphical figures includes an outline of an image as provided by the continuous segments, such that the overall image that is shown is fully bounded.

23. The personal computing device of claim 19, wherein the predetermined display location is a predetermined grid location of a grid in accordance with the defined sequence scheme.

24. The personal computing device of claim 19, wherein the non-descriptive graphical figures comprise facial features.

* * * * *